UNITED STATES PATENT OFFICE.

GEORGE N. JEPPSON, OF WORCESTER, MASSACHUSETTS, ASSIGNOR TO NORTON COMPANY, OF WORCESTER, MASSACHUSETTS, A CORPORATION OF MASSACHUSETTS.

REFRACTORY COMPOSITION.

1,081,536.      Specification of Letters Patent.      Patented Dec. 16, 1913.

No Drawing.      Application filed August 21, 1911. Serial No. 645,221.

*To all whom it may concern:*

Be it known that I, GEORGE N. JEPPSON, a citizen of the United States, residing at Worcester, in the county of Worcester and State of Massachusetts, have invented certain new and useful Improvements in Refractory Compositions, of which the following is a specification.

This invention relates to refractory compositions, the object of the invention being the provision of a loose or dry mixture consisting essentially of crushed or pulverized, previously molten alumina with which is incorporated a material capable of serving as a bond, said mixture being suitable for use after being moistened as a plastic composition or mortar in connection with refractory bricks or blocks having an alumina base. The particular bonding material used will depend largely upon the use to which the bonded article is to be put; that is to say, the bond may be acid, neutral or basic as the conditions of use may determine.

The invention also comprises a furnace wall or lining or similar structure comprising aluminous bricks or blocks, set in a composition of the character above described.

It is known that bricks or blocks consisting essentially of previously molten alumina particles fritted or bonded into strong and coherent forms constitute an excellent material for use in the construction or lining of furnaces or kilns, and in other positions involving exposure to very high temperatures. It is necessary however in many constructions of this character to provide a mortar or plastic composition for setting the refractory bricks, and this has led to difficulties, inasmuch as alumina occupies an intermediate position, from a chemical standpoint, between the acid compounds such as silica and many silicates, and such highly basic compounds as lime, and is therefore liable to be fluxed, at high temperatures, by compounds of both of these classes. Neutral compounds, while less objectionable from the above point of view, are far more fusible or less refractory than alumina, and for this reason their use is equally unsatisfactory.

According to the present invention I am enabled to prepare a mortar or plastic mixture which does not react chemically with the aluminous bricks or blocks at any temperature, and which possesses approximately the same degree of resistance to heat as these bricks. By using such mortar or plastic mixture, it is possible to construct walls or linings which are refractory under all conditions which the bricks themselves are capable of withstanding.

For the preparation of a composition in accordance with this invention, I prefer to proceed as follows: Calcined bauxite or other commercial or purified alumina is fused in the electric furnace, and the product broken or crushed to grain and preferably graded. The grain may be roasted to eliminate carbids and other reduction products. This purified grain is then thoroughly mixed, in the dry state, with a suitable bonding material which may comprise a neutral or acid plastic clay, preferably of a refractory character, or lime or magnesia. Suitable proportions are 85 to 95 parts by weight of the alumina grain, with 15 to 5 parts of the bond, these proportions being however subject to considerable variation according to the size of the grain, the plasticity of the bond, and other conditions. The alumina grain is usually of a size corresponding to 90 to 200 mesh, although larger or smaller sizes may be employed. The mixture is so compounded in all cases that the alumina grain predominates.

The above mixtures may be stored or transported and when required for use are mixed with water to plasticity and employed under the same conditions as an ordinary mortar. When strongly fired, or under conditions of use, they set into an extremely hard, durable and practically infusible mass, which while devoid of chemical action upon the alumina bricks, unites them into a strong and practically integral structure.

I claim:—

As a new composition of matter, a loose or dry mixture containing as its essential components grains of previously molten alumina and a refractory material adapted to serve as a bond, the former in predominating proportion, said mixture forming with water a plastic mass which is capable at high temperatures of binding previously burned portions of like composition without fluxing the same.

In testimony whereof, I affix my signature in presence of two witnesses.

GEORGE N. JEPPSON.

Witnesses:
PERCY A. BOECK,
HUGO W. H. BETH.